United States Patent [19]

Booth

[11] 4,023,521
[45] May 17, 1977

[54] TUMBLE BATTER AND BREADER MACHINE

[75] Inventor: Raymond E. Booth, Sandusky, Ohio

[73] Assignee: Sam Stein Associates, Inc., Sandusky, Ohio

[22] Filed: July 11, 1975

[21] Appl. No.: 595,299

[52] U.S. Cl. .................................. 118/16; 118/19; 118/603

[51] Int. Cl.² .......................................... B05C 3/10

[58] Field of Search ............. 118/19, 16, 417, 603, 118/418; 99/494, 345; 259/72; 427/242; 51/163, 316

[56] References Cited

UNITED STATES PATENTS

| | | | |
|---|---|---|---|
| 2,308,420 | 1/1943 | Hoopes | 118/19 X |
| 2,538,242 | 1/1951 | Hannon | 51/163 X |
| 3,596,633 | 8/1971 | Porter | 118/16 |
| 3,715,840 | 2/1973 | Davidson | 51/163 |
| 3,759,218 | 9/1973 | Korstvedt | 118/24 X |

Primary Examiner—John P. McIntosh

Attorney, Agent, or Firm—Baldwin, Egan, Walling & Fetzer

[57] ABSTRACT

A machine is presented which is specifically designed to accept a batch of mixed cut-up poultry parts, to coat the parts in a wet coating unit with a liquid mixture of water and egg or milk solids by tumbling them in a smaller volume of the liquid mixture, to transfer the parts with a short drip time by gravity to a dry coating unit, there to tumble them in a smaller weight of flour and coat them with the flour to an appearance equal to or better than hand coating, to continue tumbling them while excess dry material is removed from the tumbling volume and stored, to stop after a pre-set dry tumbling time and present the fully coated parts with a minimum of excess flour for hand removal, while properly cycling a sifting mechanism to entrap dough balls above a desired minimum size. Each successive batch may be liquid coated while the preceding batch is hand removed. The operator may determine the number of successive batches processed before changing the liquid mixture or removing the entrapped dough balls.

17 Claims, 25 Drawing Figures

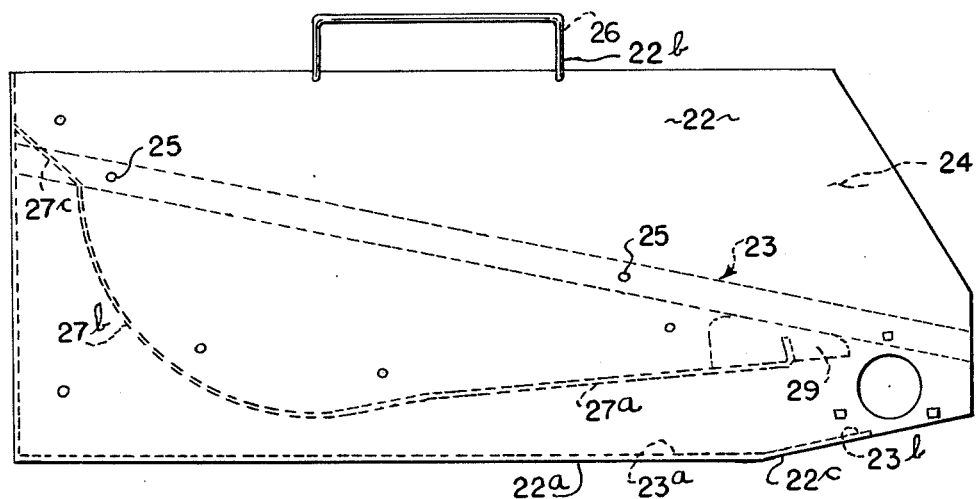
FIG.5
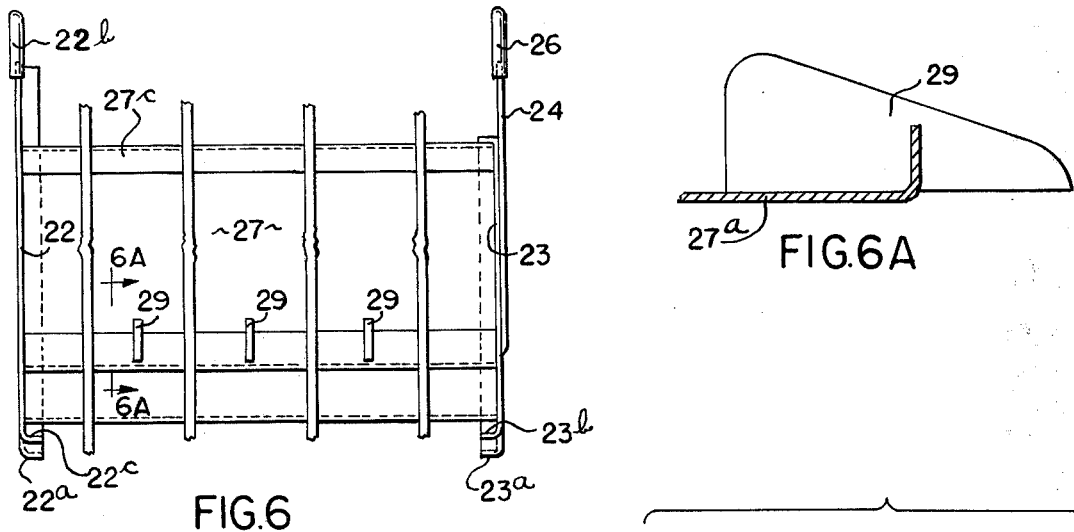
FIG.6
FIG.6A
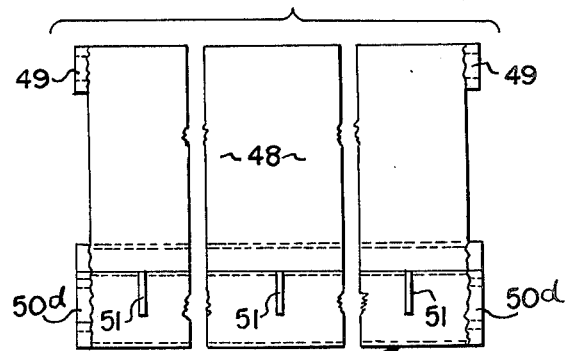
FIG.8
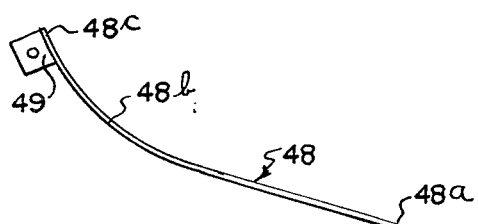
FIG.7

TUMBLE BATTER AND BREADER MACHINE

BACKGROUND OF THE INVENTION

A very large proportion, if not the greatest proportion, of fried chicken is coated by first dipping the parts in a thin mixture of water and egg or milk solids or both, allowing them to drain for a short period of time, less than one minute, then thoroughly coating the parts with flour. The flour may be hard or soft wheat, with or without seasonings added. This is the particular method for which this machine is designed.

There is a special problem associated with flour coating chicken parts, in that the cut edges of the skin have a tendency to fall free of the meat after dry coating, leaving an area unacceptably free of coating material. Hand coating with flour after dipping can produce a very acceptable product without this problem, but this process is inherently uncontrollable, due to variable drain time after dipping, variable time in the flour, and human variation when tumbling the parts in the flour. It is also messy, slow, and wasteful of flour due to excessive production of "dough balls", which must be discarded.

One machine method of coating which approaches the quality of hand coating, involves the use of a drum breader. Chicken parts and flour are introduced into one open end of a rotating drum which may have its axis tilted slightly down hill away from the entrance. Internal baffles or projections may be incorporated to assist in lifting and tumbling the parts in the flour, the action enabling loose skin flaps to open and become coated. An internal screw may be used to move the product axially. Excess flour is recovered at the open outlet end of the drum, while the coated parts are collected for cooking. The used flour is sifted to remove dough balls and is manually reloaded.

The prime objects to drum breaders in restaurant use are the irreducible minimum drum diameter required to process poultry parts, the irreducible minimum length necessary to process the volume required for the dwell time required, the difficulty of handling the large drum parts during clean-up, and the manual labor necessary to recycle the flour through the machine. Automatic flour recycling in drum breaders is costly and cumbersome. Other objections can be variation in performance as the initial flour load decreases with use, and the large volume of flour necessary as an initial charge for each batch. The batch type of processing in itself is not objectionable in restaurants, because the fryers are usually also of batch loading type. Important considerations in the design of a machine for chicken parts coating are therefore: The ability to coat the product as well as, or better than, by the hand method, consistency in coating, minimum load of coating materials, recirculation of dry coating material, continuous sifting of dry material to remove "dough balls", compact size, ease of assembly and disassembly without tools, and ease of sanitation.

An object of the present invention is to provide a food coating machine comprising a housing having parallel side walls and an imperforate pan for containing a fluidized pool of coating material extending between the side walls, the pan having a generally flat end supported in the housing in a generally horizontal position and the pan having its opposite end curved smoothly upwardly through an arc tangent to said flat end and extending from the point of tangency until the radius of said arc has swept through an angle between about 45° and 120° beyond the point of tangency, together with an open mesh wire conveyor belt substantially the width of the pan with means guiding a working run of this belt close to the upper surface of the pan along the curved end, and means for driving this belt to carry the working run in a first direction from said flat end toward said curved end of said pan, so that a pool of fluidized coating material may be provided in the pan, food portions may be placed in the pool, and the conveyor belt may be driven in the direction to tumble the food portions in the pool of coating material to thoroughly coat the same.

Another object of the invention is to provide two of such food coating machines placed one above the other in a frame with the upper member being a wet coating unit having the general flat end of the pan supported in a slightly inclined manner sloping inwardly and downwardly toward the curved end of the pan and having its opposite end curved upwardly from a point of tangency with said flat end through an arc of about 110° until the arc radius line is substantially horizontal with means for driving the conveyor belt in a tumbling direction, and thereafter driving the belt in the opposite direction to discharge the food product directly into the fluidized pool of coating material in the lower machine unit for dry coating the food product. The flat end of the pan in this dry coating unit may be horizontal, but, preferably it slopes inwardly and upwardly toward the curved end of the pan at an angle of about 15° above the horizontal, and the curved end of the pan of this dry coating unit extends upwardly from a point of tangency with said flat end through about an additional 45° until the arc radius line first reaches 30° below horizontal while the conveyor belt of this unit continues to curve upwardly preferably until the belt is about upside down and horizontal again to be certain of dislodging any food product, such as chicken, where a loose end of skin might be caught in the open mesh wire conveyor belt.

Preferably, in the dry coating unit a coating material sifter is mounted in the housing directly below the distal curved end of the pan so that coating material discharged over the end of the pan will drop directly on the sifter.

Preferably also a drip pan is inserted in the frame below the wet coating unit and above the dry coating unit to catch any liquid drippings from the wet coating unit.

Other objects and advantages of the invention will be apparent from the accompanying drawings and description and the essential features thereof will be set forth in the appended claims.

In the drawings,

FIG. 5 is a side elevational view of the wet coating unit;

FIG. 6 is an end view of the same taken from the righthand side of FIG. 5;

FIG. 6A is a side view of the belt lifters on the wet coating pan;

FIG. 7 is a side elevational view of the pan of the dry coating unit;

FIG. 8 is an end elevational view of the same taken from the right-hand side of FIG. 7;

FIG. 22 is an exploded perspective view taken from the same position as FIG. 21; while

The two units are referred to as wet coating and dry coating rather than as battering and breading units to avoid confusion in the restaurant trade. The wet coating material is variously called dip, wash, or batter. The dry coating material is sometimes called bread, flour, or seasoning.

Figure 1:
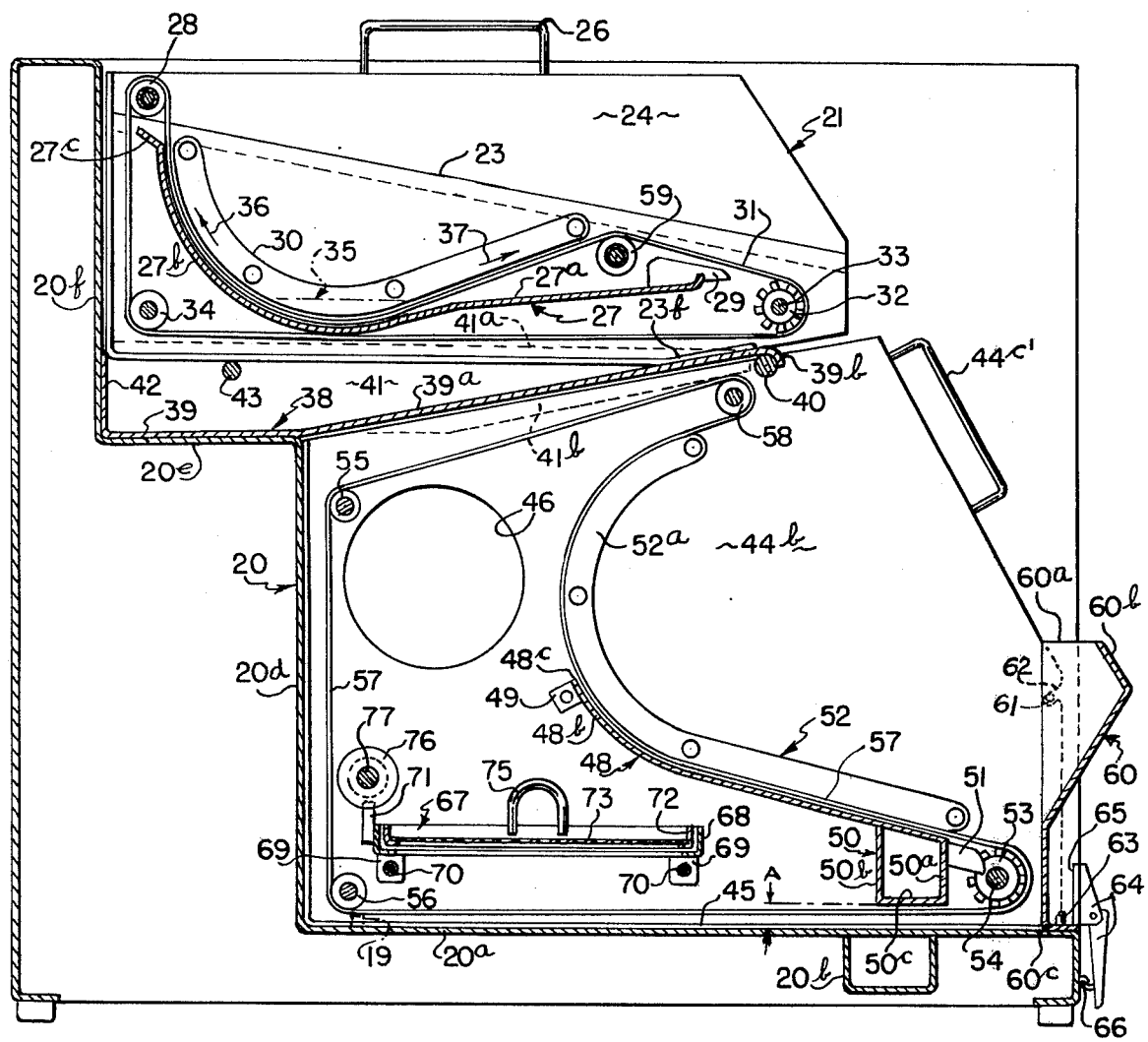
FIG. 1 is a central sectional view through the wet coating and dry coating units with handle 44c' removed.
Figure 2:
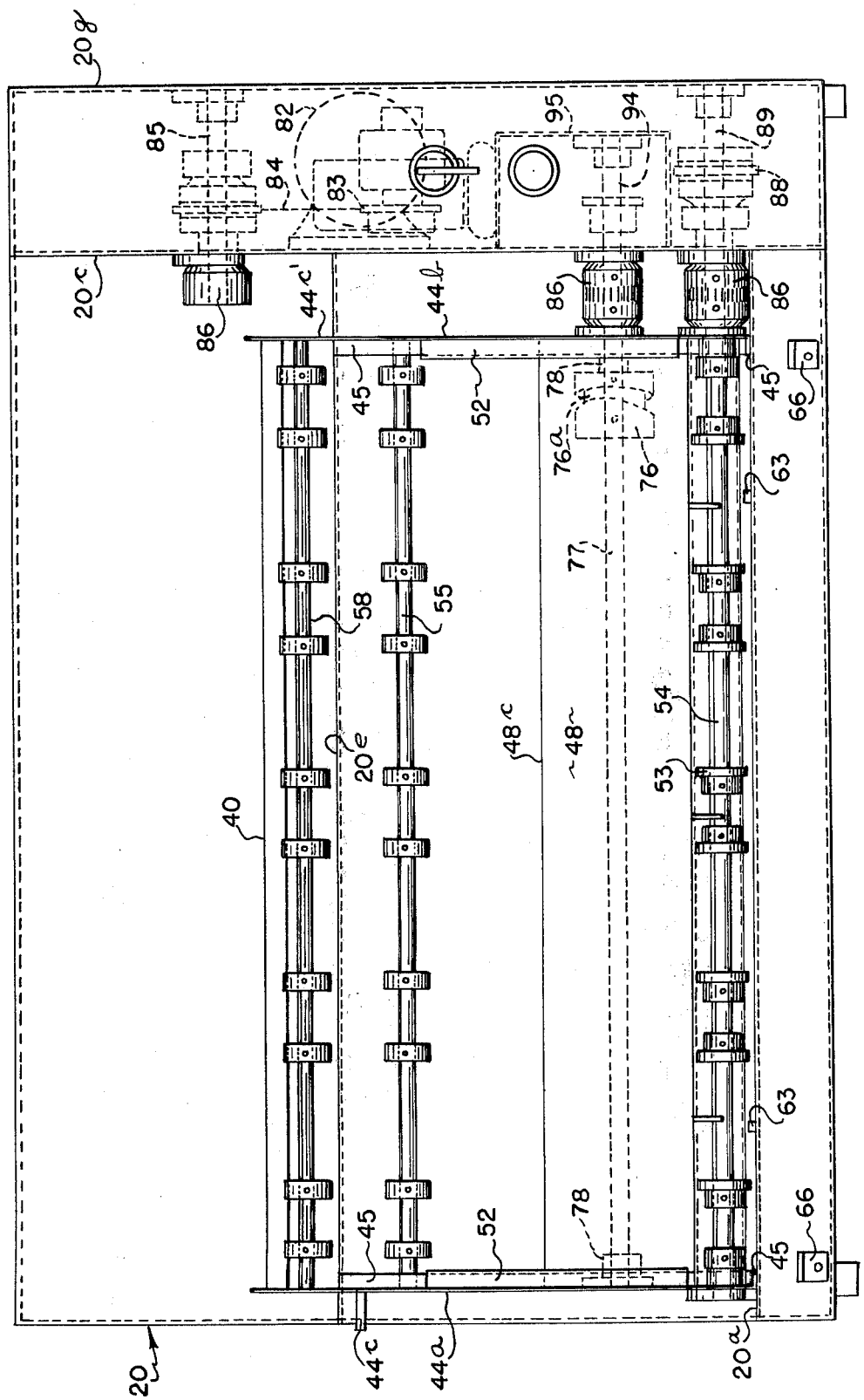
FIG. 2 is a front elevational view taken from the righthand side of FIG. 1 omitting the wet coating unit.

Referring to FIGS. 1 through 4, the coating units of this invention are assembled in a frame 20 which has a bottom 20a stiffened by a cross beam beneath it as shown at 20b and extending entirely across the bottom wall, an upstanding wall 20c, at right angles to the bottom, which supports three drive motors, and has three drive stub shafts extending through the wall 20c, a lower vertical back wall 20d, connected to a horizontal shelf 20e which, in turn, supports an upper back wall portion 20f. The right-hand end of the frame, as seen in FIG. 2, is closed by a vertical wall 20g and the space between the walls 20c and 20g contains the stub shaft supports, drive chains, and controls.

The upper, or wet coating unit 21, is best seen in FIGS. 1, 5 and 6. This wet coat conveyor unit comprises a left side wall 22, as seen in FIG. 6, with an inturned reinforcing flange 22a, 22c and a lifting handle at its upper edge at 22b. It also comprises a right side wall parallel to 22 and indicated at 23 and having an integral inturned reinforcing flange 23a, 23b. This all is completed by bolting thereto a wet coat closure wall 24 which is substantially coplanar with the wall 23 and is bolted thereto by bolts through openings 25. Another lifting handle is fastened to the top of the plate 24 as indicated at 26. The reason for the two part wall 23, 24 is to make it easy to replace the endless wire mesh conveyor belt, later described, because, after removal of the plate 24, the right side panel wall 23 is small enough to permit the endless belt to be slid over that side for replacement by a belt of the proper length provided by the manufacturer. An imperforate wet coat pan 27 is welded to the side walls 22 and 23 and extends completely from side to side of this unit. This pan has a flat portion 27a which is generally horizontal (means plus or minus about 15°) although as shown in the drawings it inclines slightly downwardly from right to left, and a curved portion 27b which extends arcuately from the flat portion toward the left as seen in FIG. 1 and terminates in lip 27c which extends beneath a wiper cross rod 28 to catch any drippings from the wire mesh conveyor where it passes over the cross rod. Preferably, a plurality of generally triangular belt lifters 29 are welded into position at the right-hand end of pan 27 to smoothly lift the conveyor belt there. Means is provided for guiding a working run of the conveyor belt close to the upper surface of the pan 27, particularly along the curved end of said pan. This comprises two curved strips 30 bolted to the inner faces of the side members 22 and 23.

The wet coat conveyor belt 31 is an open mesh wire belt made by the Wire Belt Company of America and sold under the brand name "Flat Flex No. 1061". It is driven by a series of drive sprockets 32 mounted to turn with the drive shaft 33 which will be later described. The belt then passes over the belt lifters 29, over wiper cross rod 59 and beneath the guides 30 to pass over the wiper cross rod 28, then over pulley equivalent cross rod 34 and back to the drive sprockets 32. One quart of wet coating material will fill the pan 27 to the dotdash line indicated at 35. The belt guides 59, 30, and 28 in FIG. 1 guide belt 31 through a flat portion at the right hand end and then through an arcuate portion tangent with the flat portion and extending arcuately upwardly from a point of tangency with the flat portion for about 110°.

When the belt 31 is driven in the direction indicated by arrow 36, the food portions, such as chicken, will be carried up the curved portion 27b of the pan and caused to tumble down the slope repeatedly, doing such tumbling until all parts are thoroughly coated with the wet coating material. Means is then provided to drive the belt 31 in the opposite direction as indicated by the arrow at 37 which will cause the coated food product to rise out of the wet coating pool to pass over the wiper cross rod 59 approximately free of excess wet coating material and to fall off the conveyor 31 at the sprockets 32 to fall onto the dry coating unit beneath.

Figure 17:
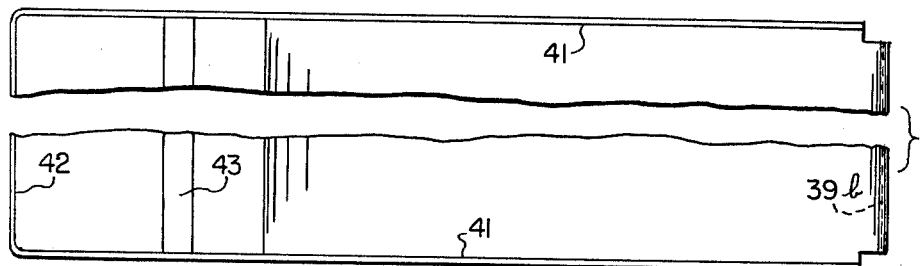
FIG. 17 is a top plan view of the drip pan.
Figure 18:
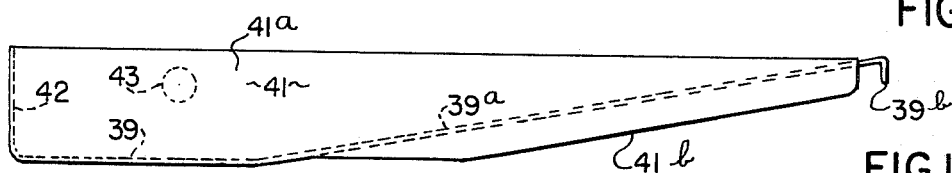
FIG. 18 is a side elevational view of the same.

A drip pan 38 is provided beneath the upper wet coating unit and above the lower dry coating unit as shown in FIG. 1. Pan detail is shown in FIG. 17 and 18. This drip pan has a flat bottom at 39 to rest upon the shelf 20e and an inclined portion 39a sloping forwardly and upwardly and preferably having a downturned end 39b which forms a hook resting upon a cross rod 40 which is supported in the dry coating unit. The pan has parallel side walls 41 and a rear wall 42 which rests against the frame wall 20f as seen in FIG. 1. A cross rod 3 is fixed in the side walls 41 and the wall panels 22 and 23 of the wet coating unit rest on this cross rod. The pan side walls at 41a rise above the top of the cross rod 43 and, when the parts are in the position of FIG. 1, the bottom edges of the wet coat conveyor walls 22 and 23 lie within the side walls 41a which serves to hold contact between the couplings (later described) between the drive shaft 33 and its stub shaft. At the same time the sloping contact between the inclined bottom portion 39a and two short upwardly inclined portions 22c and 23b which are respectively parts of the flang members 22a and 23a, help to maintain shaft alignment of the driving connection.

The dry coating unit is best seen in FIGS. 1, 4 and 7 and 8. This comprises parallel left and right wall panels 44a and 44b as best seen in FIG. 2, each of these panels having a short inturned reinforcing flange 45 extending along the bottom and up the back side. At least one of these walls has a cleaning access opening 46. A lifting handle 44c is rigidly connected to each of the side walls near its upper portion as indicated in FIGS. 1 and 2.

A dry coating material pan 48 provides a continuous surface extending from side wall 44a to side wall 44b to which attachment is made by bolting the projections 49 and 50d to the side walls. Here, the pan 48 has a flat portion 48a which may be horizontal but which operates more smoothly if it is inclined about 15° above the horizontal as shown in FIGS. 1 and 7. The pan has a curved portion 48b which extends arcuately through approximately an additional 45° terminating at an overflow edge 48c which will later be described. A plurality of curved end belt lifters 51 are welded to the pan 48 at the lower right-hand end thereof as seen in FIGS. 1 and 7.

Means is provided for guiding a working run of the dry coating belt conveyor close to the upper surface of the pan 48 up to the point 48c and then curving upwardly and inwardly as a belt reverser to a total of about 165° beyond the flat portion of the path. These guiding members, indicated at 52, are flat strips of material bolted to the side walls 44a and 44b.

The dry coating belt conveyor is of open mesh wire construction as described in connection with the conveyor belt 31. It passes over a series of drive sprockets 53 rigid with the drive shaft 54 which will be later described. The belt passes from the drive pulley upwardly close to the pan 48, guided by the guiding strips 52 and then around the curved portions 52a of the guiding strips and over a pulley equivalent cross rod 58, then back to another cross rod 55, then down to a cross rod 56 near the bottom 20a and then back along the bottom to the drive sprockets 53. This drive belt is marked 37 and it will be noted that both the belts 31 and 37 are indicated in full lines because it would be physically impossible to indicate the wire mesh of the belt on the drawing.

Means is provided for forcing dry coating material onto the belt 57 on the upper side of the pan 48. This means includes the beam 50 having front and rear walls 50a and 50b, respectively, which are vertical and extend downwardly from the pan 48 and are rigidly connected therewith. These walls terminate at a predetermined distance from the bottom wall 20a of the frame where they are joined by a roof 50c parallel to the bottom wall 20a, thus forming a slot having the height A as indicated in FIG. 1 and extending the full length between the walls 44a and 44b. The belt 57, when running, moves the dry coating material along the bottom 20a and beneath the roof 50c forcing the same to pass upwardly in front of the wall 50a and so up through the openings in the open mesh belt 57 where it is carried by the belt onto the pan 48. The parts are so constructed that the amount of dry coating material pumped through the slot 20a, 50c is approximately equal to that which passes over the rear end of the pan at 48c when food products are being coated.

Figure 9:
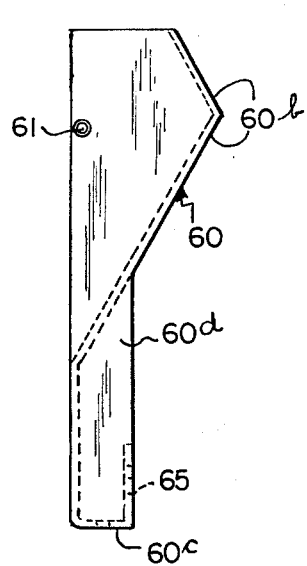
FIG. 9 is an end elevational view of the dry coating unit shroud.
Figure 10:
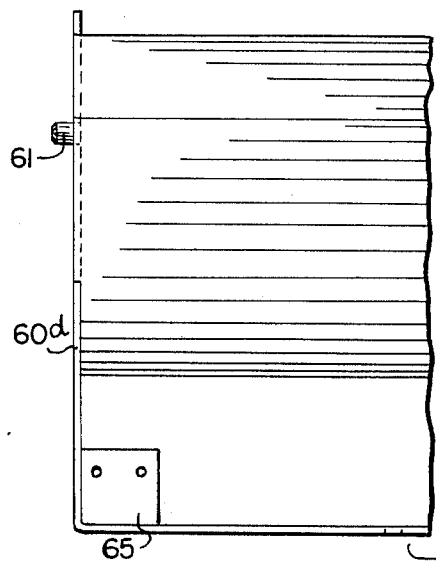
FIG. 10 is a side elevation of the shroud taken from the right-hand side of FIG. 9.
Figure 10:
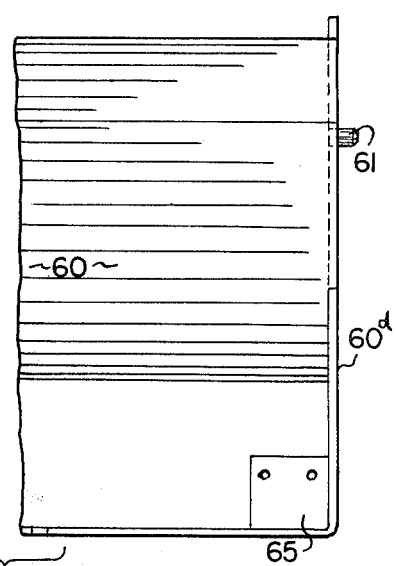

Means is provided to close the open front end, toward the right in FIG. 1, of the dry coating material volume between the walls 44a and 44b to retain the dry coating material inside the dry coating volume. This comprises a dry coating shroud 60 as seen best in FIGS. 1, 9 and 10. This is of a size to close the normally open space on the right-hand side of the dry coating material volume from the level of the frame floor 20a up to the level 60a as indicated in FIG. 1. Preferably, this shroud is bent outwardly and then inwardly as indicated at 60b to deflect splashed dry coating material back into the dry coating section. When in the closing position shown in FIG. 1, the top of the shroud 60 is held in position by two pins 61 which extend outwardly from the ends of the shroud and which enter into a pair of sloping slots 62, one in each of the side walls 44a and 44b. The bottom of the shroud is held in position by upstanding pins 63, seen in FIGS. 1 and 2, which enter into suitable openings in the bottom flange 60c of the shroud. This shroud is mounted in proper position by holding it near the front of the dry coating section with the shroud top slightly tilted away from the dry coating section. The bottom corner of the shroud is then moved inwardly toward the dry coating section until the bottom flange holes can be dropped over the pins 63. The lower corners of the side walls 60d are then inside the dry coating conveyor side walls 44a and 44b. Then one rotates the shroud inward toward the dry coating section while lifting slightly until the pins 61 enter the slots 62. Then two toggle type latches 64 attached to plates 65, rigid with the flange 60c at opposite sides of the shroud are hooked over strike plates 66 and are pulled downward to locking position which pulls the pins 61 into the slots 62 and pulls the bottom flange 60c tight onto the bottom wall of the frame 20a. In this position, practically all of the dry coating material is retained in the dry coating section and the shroud is removed when it is desired to pump the dry coating material out of the machine toward the right beneath the sprocket 53.

Figure 13:
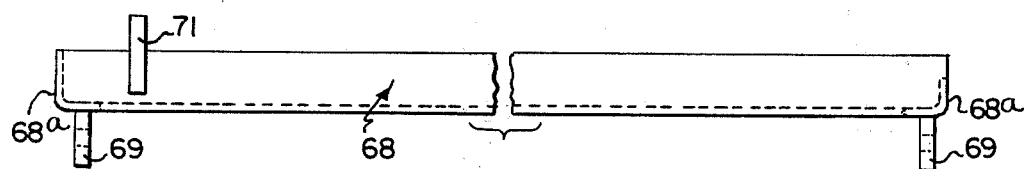
FIG. 13 is a side elevational view of the sifter frame.
Figure 14:
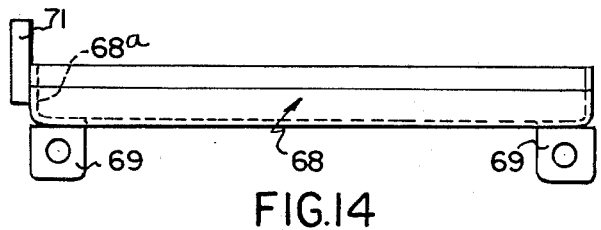
FIG. 14 is an end elevational view of the same.
Figure 14A:
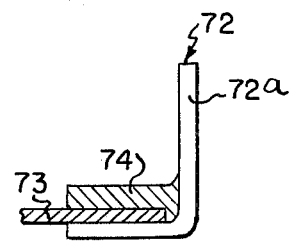
FIG. 14A is a sectional view of one side or end of the sifter screen.
Figure 15:
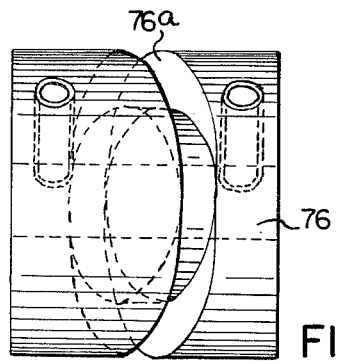
FIG. 15 is a top plan view of the shifter drive cam.
Figure 16:
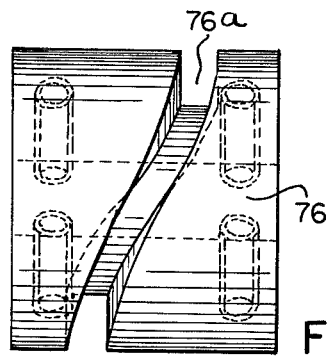
FIG. 16 is a side elevational view of the same.

With the parts heretofore described in the position shown in FIG. 1, there is room beneath and behind the dry coating pan 48 to install a sifter 67 as best seen in FIGS. 13, 14 and 14A. A long rectangular tray frame 68 is provided which is hollow in the center and surrounded by an L-shape member 68a, with two guide brackets 69 at each end welded to the lower side of the frame 68 extending downwardly. These are at the four corners of the rectangle. These brackets, each at one end in line with one at the other end, have openings to receive a slide rod 70, the two slide rods having their opposite ends fixed in the walls 44a and 44b. In each of the holes in the brackets 69 there is first inserted a Nylon flanged bearing. Near one end of the structure 68, on one side thereof, is fixed an upstanding pin 71 which is a follower for a sifter cam 76 best seen in FIGS. 2, 15 and 16. Within the sifter frame 68 there is mounted with slight clearance a sifter screen 72 which consists of an L-shaped frame member 72a surrounding a rectangular hollow center, on which a sifter screen 73 is welded in position on the lower flanges, after which self curing seal 74 is applied to close the screen openings in proximity to the frame 72a. At one or both ends of the sifter screen frame there are mounted upstanding handles 75.

For oscillating the sifter there is provided a rotary cylindrical cam 76 fixed concentric with its driving shaft 77, this shaft in turn being held against endwise movement by collars 78. This cam has an inwardly extending sinuous slot 76a extending uninterruptedly around the periphery of the cam and generally in a plane inclined relative to the cam axis, the sides of this slot being radial of the cam. The cam follower pin 71, previously described, has its axis vertically aligned with the axis of the cam drive shaft 77.

The manner in which the cam slot is constructed is as follows. The cam blank is mounted on one shaft of a 1:1 right angle gear box. The gear box is then mounted on a milling machine table so that it is fully free to move in the direction parallel to the axis of the shaft mounting the cam blank, and is fully restrained in other directions. A crank or eccentric with a total stroke equal to the sifter travel desired is mounted on the right angle shaft, and a connecting rod is run from that crank to a fixed point on the table. When the crank shaft is turned one revolution, the miter box must reciprocate one complete cycle axially of the shaft mounting the cam blank, and the cam blank must make one complete revolution. When the cam blank is properly positioned under the vertical axis milling machine head, a milling cutter will trace a sinuous endless path around the periphery of the blank. Then all side elements of the slot produced are radial to the cam axis. The motion of the sifter produced by this cam is nearly identical to that which would be produced by the above described crank and connecting rod, where they connected directly to the sifter.

Figure 11:
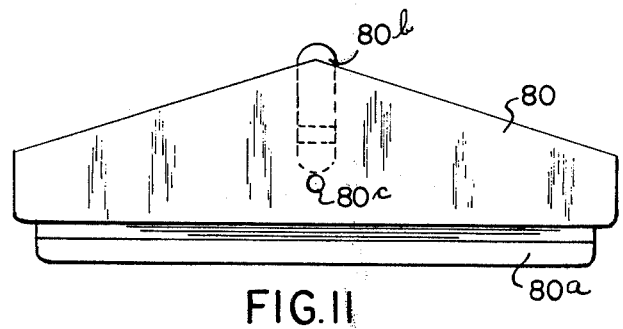
FIG. 11 is a side elevational view of the sifter access door.
Figure 12:
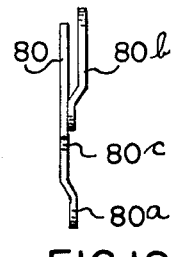
FIG. 12 is an end elevational view of the same.

An opening is provided in the wall 44a directly opposite the sifter screen 72, 73, which is of a size to provide for the operator to lift out the sifter screen and remove dough balls. A removable door, shown in FIGS. 11 and 12, is provided to close this opening. This comprises a generally flat plate 80 which has its lower edge offset inwardly at 80a so as to pass through the opening in wall 44a and rest against the inside surface of that wall. Welded in the center of this plate near the top is a clip 80b bent inwardly to provide a space between the clip and the front plate 80 about equal to the thickness of the plate 44a. In applying the door to the opening, the clip 80b is first placed inside the top of the opening in plate 44a and lifted far enough to allow the bottom end 80a to be inserted into the lower part of the opening, after which the plate 80 is dropped slightly to hold the door in place. A knob bolted to opening 80c provides a handle for the door.

Figure 3:
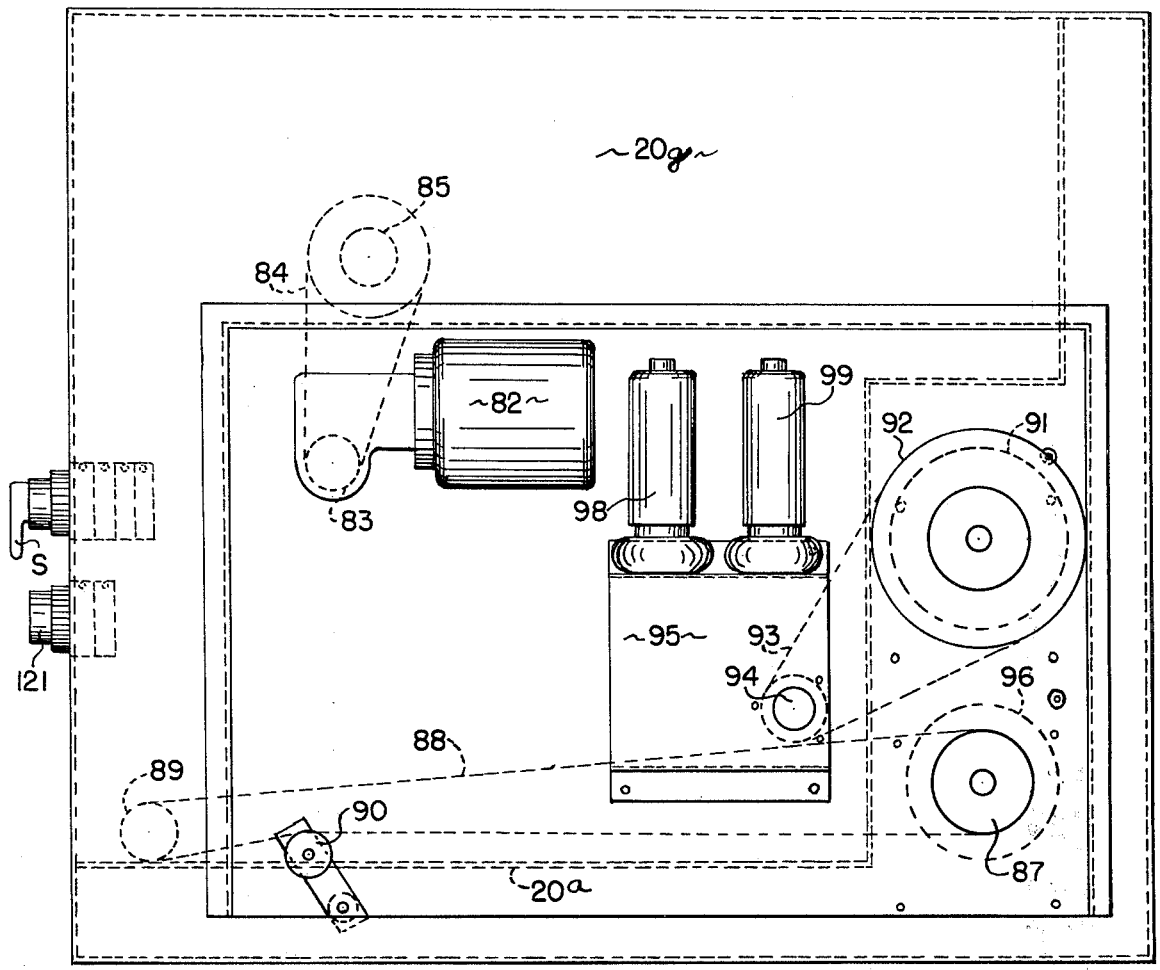
FIG. 3 is an end view taken from the right-hand side of FIG. 2 with the back cover removed for clarity.
Figure 4:
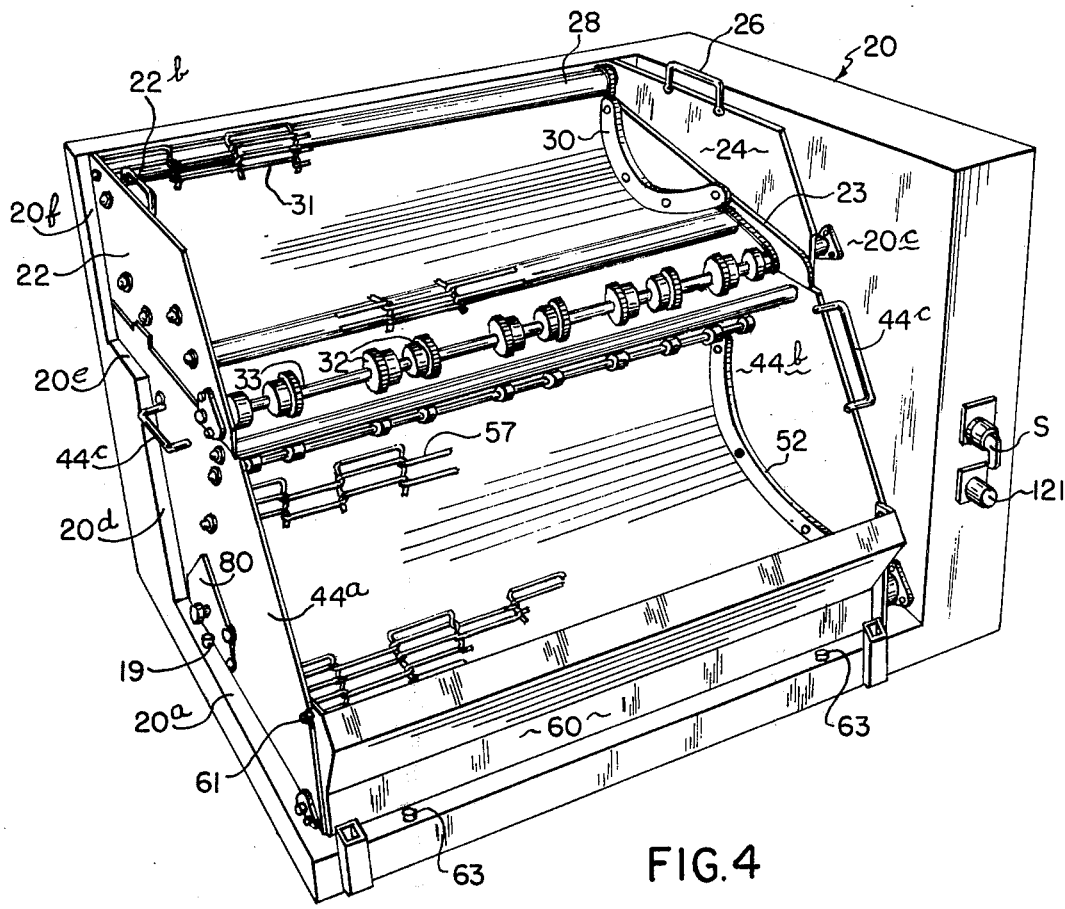
FIG. 4 is a perspective view taken from the right-hand side of FIG. 1.

The drives and controls are best seen in FIGS. 2 and 3. The wet coat drive motor 82 has an output sprocket 83 connected by drive chain 84 with the wet coat stub shaft 85. This stub shaft has bearings in plates 20c and 20g and bears at its inner end a drive coupling 86. The dry coat motor 96 has an output sprocket 87 which is connected by drive chain 88 to stub shaft 89. This stub shaft has bearings in plates 20c and 20g and carries at its inner end a drive coupling 86. A chain tightener is indicated at 90. The sifter motor 92 has a drive shaft driving a sprocket 92 which is connected by drive chain 93 with stub shaft 94. This stub shaft has bearings in the plate 20c and bracket 95 and has a drive coupling 86 at its inner end. Shaft 33 has a mating connection with drive member 86 on stub shaft 85. Shaft 54 has a drive connection with the driving member 86 on stub shaft 89. Sifter drive shaft 77 has a suitable connecting member with the member 86 on shaft 94. The dry coating and wet coating stub shafts 89 and 85, respectively, are equipped with torque limiting devices which protect personnel and equipment. If a belt is jammed and stopped during operation, the torque limiter slips until the jam is removed, when it will again drive the unit. These torque limiting devices are not shown as they have no part in the present invention from the point of novelty.

The elements 98 and 99 are time delay devices referred to hereinafter.

The drive connections 86, and their coacting counterparts, comprise interfitting alternating tooth and recess portions which are easily slid into a coacting condition when the parts are assembled as later described.

Figure 19:
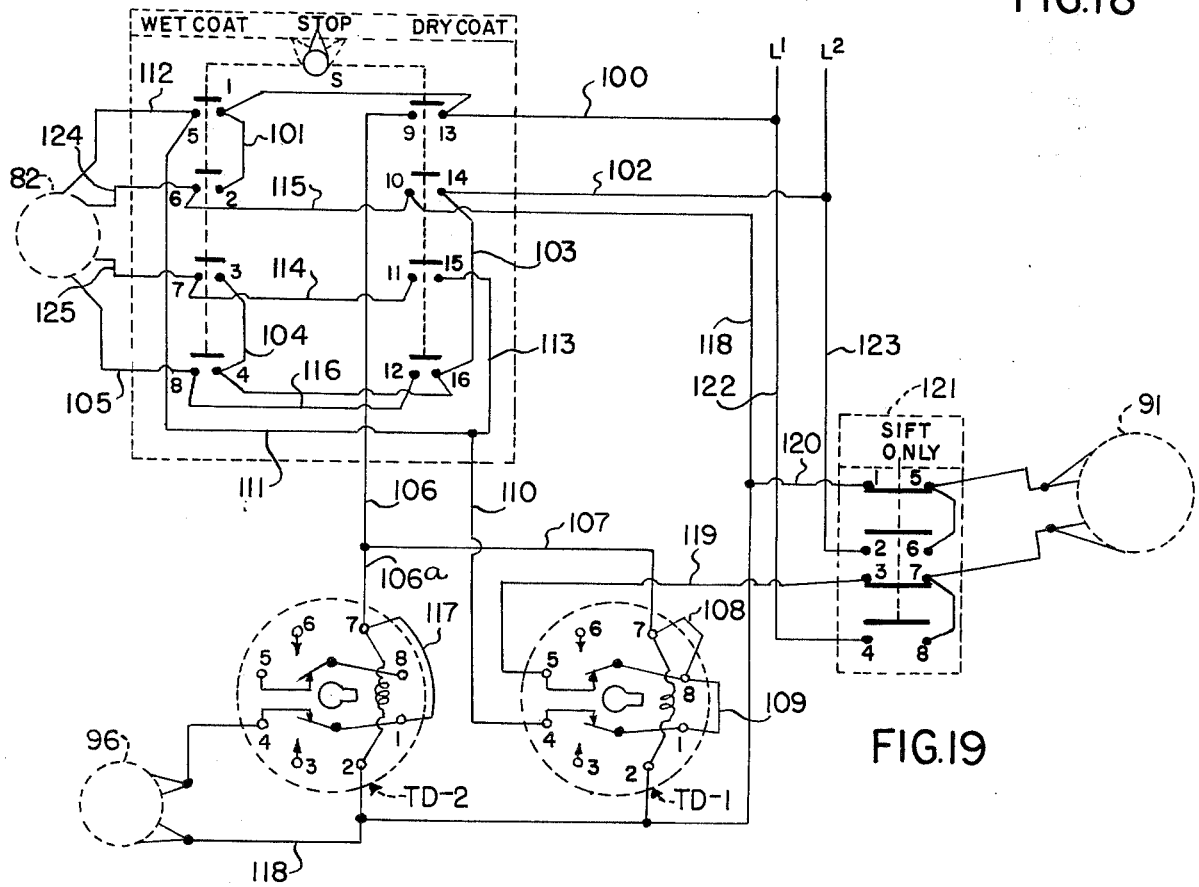
FIG. 19 is a control diagram illustrating one type of circuitry for driving the mechanism shown.

Referring to FIG. 19, the controls will now be described. With the selector switch S, seen at the upper left-hand side of FIG. 19, being moved to the wet coat position which is indicated in dotted lines, on the associated selector the contacts 1–5, 2–6, 3–7, 4–8 all close. Contacts 9–13, 10–14, 11–15, and 12–16 all remain open. The selector switch then furnishes power to the wet coat motor 82, only. L1 power is connected through line 100, and contacts 1–5, to line 112; also through wire 101 to contacts 2–6 and line 124. L2 power is connected through wire 102, 103, 104 and contacts 3–7 to line 125. L2 power is connected through wire 102, 103, and 4–8 contacts to line 105 to the wet coat motor. The wet coat motor then runs in tumble dip direction, as shown in arrow 36, as long as the selector switch stays in this wet coat position. The dry coat motor and sifter motor will not run, nor are time delays TD-1 and TD-2 energized, because none of these circuits are complete.

The wet coat unit is allowed to run in this condition until the food product mass turns over at least four times, or about 20 seconds. The mass rotates loosely about an undefined horizontal axis, with considerable relative motion between parts, and scrambling of parts. Tests with tinted wet coating indicate that the interior surfaces of the mass are also wet coated due to trickling through the mass, even though the wet pool is quite shallow in relation to the mass height. The operator then moves the selector switch S to the central or stop position indicated in full lines in FIG. 19, just momentarily to allow the wet coat section to stop moving. If the switch is moved too quickly to the "dry coat" position, the wet coat section may not stop. The operator then turns the selector switch to the dry coat position indicated in dot-dash lines in FIG. 19. The wet coat section will then run in the discharge direction for about 15 seconds and stop. This is sufficient time to discharge all of the food products into the dry coat section. This time is adjustable.

The sifter will operate for the same time as the wet coat section, and then stop. This will shake through all of the dry material stored on top of the sifter and will discharge the sifted material onto the frame bottom 20a for initial use in building up the pool or puddle of dry coating material on the pan 48 for the present batch. Thereafter, the stopped sifter screen acts as a reservoir to catch and hold excess dry coating material.

When the selector switch is moved to the "dry coat" position as shown in dot-dash lines in FIG. 19, on the selector switch in this position, contacts 9–13, 10–14, 11–15, and 12–16 all close. Contacts 1–5, 2–6, 3–7, and 4–8 all remain open. The selector switch then furnishes power to the wet coat motor 82. L1 power is connected through line 100, contact 9–13, lines 106, 107, 108 and 109 to TD-1 timer contact 1–4 and then to selector switch contact 5 through lines 110, 111 to wire 112. Also L1 power is connected through line 100, contact 9–13, lines 100, 106, 107, 108 and 109, to timer TD-1 contact 1–4 and lines 110 and 113 to selector switch 11–15 and wire 114 to wire 125. L2 power will then be supplied to the wet coat motor through line 102 to contacts 10–14 to wire 115 to wire 124. L2 power will also be supplied through lines 102 and 103 and contacts 12–16 to wire 116 and wire 105. The wet coat motor is now running in the discharge direction as indicated in arrow 37 because power to the starting winding leads 124 and 125 to motor 82 has been reversed from the previously described condition. It will run in this direction as long as the TD-1 contact 1–4 remains closed.

The selector switch in this position also furnishes power to the dry coat motor 96. L1 power is connected through line 100 and contacts 9–13 and through lines 106, 106a and connector 117 to TD-2 contact 1–4 to the dry coat motor. L2 power is connected through line 102, contacts 10–14 and line 118 direct to the dry coat motor 96. The dry coat motor will then run in the tumble coating direction for as long as TD-2 contact 1–4 remains closed.

The selector switch in the "dry coat" position also furnishes power to the sifter motor 91. L1 power is connected through line 100, contacts 9–13, lines 106, 107 and connector 108 to TD-1 contact 8-5 and line 119 to the normally closed contact 3–7 in the "sift only" push button arranged as shown at 121 to sifter motor 91. L2 power is connected through line 102, contacts 10–14, lines 118 and 120 to the normally closed contact 1–5 in the complex at 121 to the sifter motor. The sifter will then run for as long as TD-1 contact 8-5 remains closed.

The selector switch in the "dry coat" position also furnishes power to the time delay relays TD-1 and TD-2. L1 power is connected through line 100, contacts 9–13, lines 106, 107 to TD-1, terminal 7; and through lines 106, 106a to TD-2 terminal 7. L2 power is connected through line 102, contacts 10–14 and line 118 to TD-1 terminal 2 and also to TD-2 terminal 2.

TD-1 is set at 15 seconds delay, after which its contact 1–4 opens to stop the wet coat motor, and contact 8-5 opens to stop the sifter motor. TD-1 coil remains energized until the selector switch is moved away from the dry coat position. TD-2 is set at 35 seconds delay, after which its contact 1–4 opens to stop the dry coat motor. TD-2 coil remains energized until the selector switch is moved away from the dry coat position.

The sifter will operate when the "sift" only button at 121 is depressed, with the selector switch in any position. At such time, the contacts 1–5 and 3–7 are opened and contacts 2–6 and 4–8 are closed. Then L1 power is furnished through line 122 to the sifter motor 91 through contacts 4–8. L2 power is furnished through line 123 to the sifter motor through contacts 2–6.

Note that the dry coating section will run for about 20 seconds after the wet coat section and sifter stop, and then the dry coat section will stop. At this point, the food product is fully coated, with most excess dry coating material removed and stored on the sifter screen. This timing is adjustable.

The operator may then remove the coated food product to the cooker baskets or racks. Note that as soon as the wet coat section stops, as indicated above, a new batch of product may be spread in the wet section. Then, as soon as the dry coating section stops, the selector switch may be turned to the "wet coat" position, so that the new batch may be wet coated while the finished product is being removed from the preceding batch.

Additional dry coating material must periodically be added to replace that used up by the preceding batches. In one type of use, dry coating material use is approximately 5 percent of the food product weight, and parts from four whole chickens, which this machine is designed for, weigh about 10 pounds, therefore, the dry coat use would be approximately 8 ounces per batch. This is slightly less than 2 cups. Experience will indicate the best amount to add. Dry coating material in the machine should be kept between the limits of 6 to 9 pounds. Too little will result in poor coating action, and too much will result in excess flour "puddle" in the dry coating section at the end of the coating cycle.

After about 20 birds have been processed, the operator should then press and hold the "sift only" button until all dry material sifts through. Then remove the sifter access door, and lift out the sifter screen, and dump the trapped dough balls. This is also a good time for replacing or replenishing the wet coating material in the wet coating section, and cleaning the wet coating machine parts, if desired.

To empty the residual dry coating material at the end of a day, one should remove the dry coating shroud 60, place a box or pan under the front edge of the machine to catch the dry coating material, then turn the selector switch to "dry coat" position and most of the dry material will be moved out of the machine to the receiving tray. Then remove all loose parts to the wash area, and brush the remaining dry material into a tray and dispose of it as desired.

All parts except the main frame will fit individually into a standard 18 inch by 26 inch sink or large dishwasher. The main frame may be hosed or wiped clean.

A feature of the dry coating unit is the tumbling action given to the product, as though it were being drum tumbled, but without using a drum. It will be noted that the conveyor belt 57 slopes upward 15° in the direction of belt travel, then curves backward across the belt reversers an additional 165°. The 15° slope is not absolutely necessary in the machine, but it does help to separate the pieces, as they tumble more than they would if the entry belt section were horizontal. However, such a structure would operate successfully. A product piece tumbling off of the top of the pile will tend to continue falling down the 15° slope. The loose tumbling effect is similar to that obtained when using a larger radius drum, but this structure does not occupy as much space. The slope also provides reserve flour or dry material storage underneath, raises the trailing edge 48c in relation to the frame bottom wall 20a, and provides space for the sifter assembly.

The position of the trailing edge 48c of dry coating pan 48 has been described as being about 45° along the arcuate curve 48b above the sloping flat portion 48a. This is the position that best suits this embodiment in maintaining the desired dry coating "puddle" on top of the belt 57, for the designed recirculation rate achieved by the pumping arrangement at slot A in FIG. 1. In other designs, the "puddle" may be increased or decreased with the same pumping arrangement, by raising or lowering the location of trailing edge 48c. Similarly, the "puddle" may be changed by varying the pumping arrangement while maintaining the trailing edge 48c at the said location. In general, increasing the height A of the slot will increase the recirculation rate, hence will increase the "puddle" for a given location of 48c. Varying the cross wires of belt 57 in thickness or spacing will also affect the "puddle" configuration. It is possible to build a machine wherein the location of the trailing edge 48c is adjustable in use, but this feature is not desirable at this time due to the drawbacks of additional cost and increased sanitation problems.

The 165° reverse curve of the conveyor belt 57 is not absolutely necessary but it has various advantages. If a piece of, or projection on, the product becomes trapped between cross wires of the belt while it is moving around the belt reverser 52, it is afforded a good opportunity for release at the top of the 165° curve. At this point, the belt is traveling horizontally again, although it is now upside down, the wires are again open to their nominal spacing and the product would be suspended by its trapped portion. The open wire spacing of the conveyor belt, the horizontal position of the belt at the top of the arc, and gravity combine to release the trapped portion. This occurs extremely rarely in any case. The belt structure is filled in at parts of belts 31 and 57 in FIG. 4. It consists of a plurality of cross wires bent alternately forward and back as the wire extends across the belt and the forward loops of one wire are interlaced with the rearward loops of the adjacent wire so that the finished belt appears to consist of generally parallel wires extending crosswise of the belt on 0.286 inch centers. These narrow belt cross wire centers preclude nearly all product entrapping.

The structure shown in FIG. 1 can be assembled as follows without the use of any tools. First, lift the dry coating conveyor assembly by grasping handle 44c with the left hand and handle 44c' with the right hand. Facing the front of the machine, lift the left side of the conveyor unit slightly higher than the right side, place the bottom of the right side panel 44b on frame bottom wall 20a, with the drive couplings 86 in close proximity. Holding the left side slightly higher, such as one-half inch, slide the conveyor assembly to the right to engage both the dry coating coupling and the sifter coupling. When these are engaged, lower the left side of the conveyor onto the frame bottom wall 20a. The left side 44a will fall inside the pin 19 shown in FIG. 4, and in dot-dash lines in FIG. 1 as representing a position on the nearer side of the bottom wall 20a. This retains the coupling engagement between the driving members 86 and their counterparts. The dry coat shroud 60 is then assembled in the position shown in FIG. 1. Then add the drip pan dropping it over the dry coat section, so that the side wall extensions 41b are outside of the side frame members 44a and 44b of the dry coat section. The curved lip 39b hooks over the drip pan support rod 40, which is bolted into the side members 44a and 44b. Then add the wet coat conveyor unit by grasping the left side handle 22b with the left hand, and the right side handle 26 with the right hand. Facing the front of the machine, and holding the left side about one inch higher than the right side, place the bottom of the right side panel of the conveyor 23 on the drip tray cross rod 43 with the drive coupling members 86 in close proximity. While holding the left side high, slide the wet coat conveyor assembly to the right to engage the driving coupling. Then lower the left side of the conveyor until it touches the cross rod 43, where it will be inside the left-hand side of the drip tray.

The machine size, fully assembled, is 31¾ inches wide by 21¼ inches high by 25½ inches deep. The construction is all stainless steel and approved synthetics. There are no exposed male or female threads anywhere in the operating body. Wet belt speed is nine feet per minute in either direction. Dry belt speed is 40 feet per minute. Sifter drive shaft speed is 510 r.p.m. which gives 1020 directional changes per minute for sifting. The total assembled weight is about 175 pounds. All removable pieces will fit individually into a wash sink 18 inches wide by 26 inches long.

The wet coating material operating load is one pint to one quart. One quart will fill the tray 27 to the dot-dash line 35 in FIG. 1. The dry coat material operating load is between 6 and 9 pounds. The food product batch for the machine described is a nominal ten pounds, or all parts from four cut-up chickens. The dry coating material recirculation rate is approximately 35 pounds per minute, or four to seven times the dry material load. The sifting capacity is approximately 100 pounds or three times the circulation rate. The sifter screen mesh has 0.062 inch square openings, sufficiently small to retain troublesome dough balls. The radius of the tumbling arc of the wire mesh conveyor belt in both the dry coating and wet coating units must be above a minumum figure for if the arc radius falls below a certain minimum, the tumbling will cease and the product load will rotate as a unit. As the radius is increased, tumbling action can be increased up to an acceptable maximum consistent with machine size. The radius of bend of the conveyor belt surface shown in FIG. 1, in both the wet and dry coating unit, is approximately 4 inches, which approaches the minimum permissible with this food product. By sloping the belt upward to the entry to the tumbling arc in the dry coating section, as indicated at 48a, the effective arc radius is substantially increased, and product tumbling is quite acceptable, yet machine size is not substantially increased.

The sifter and the dry coating material "pump" are so arranged as to store the excess dry coating material on the sifter when the food product is fully coated and is being removed manually. It is known that the sifter will not pass a bridging type of dry material if it is not operating. It is also known that if no additional dry material is pumped to the tumbling volume, that volume will be gradually emptied by the recirculation process, the latter portion by the entrainment of dry material by the belt cross wires. It is obvious that if the sifter area is large enough, substantially all breading in the machine can be retained on the screen. This is true here. The machine, therefore, has a time delay incorporated in the sifter motor circuit to stop the sifter drive at the proper point in the dry coating cycle. The time delay relay may be varied to suit specific end user requirements, thus insuring that sifter stop time can be the proper proportion of the total dry coating time.

The high sifter capacity of the machine insures that the dry coating puddle is re-established in time to receive the next batch of product from the wet coating section. If the sifter retains the maximum original load of 9 pounds of dry material, it empties within 6 seconds when the selector switch is moved to the dry coat position. With the relatively high recirculation rate of this machine, the dry coating "puddle" is fully re-established within 15 seconds, usually within 10 seconds of selector switch movement to the dry position.

In the claims, a "fluidized pool of coating material" means liquid or finely divided solids that flow almost like liquids when agitated.

The individual coating sections may be used separately if desired, and when properly designed. A second embodiment of the dry coating machine is illustrated in FIGS. 20, 21, 22 and 23.

Figure 20:
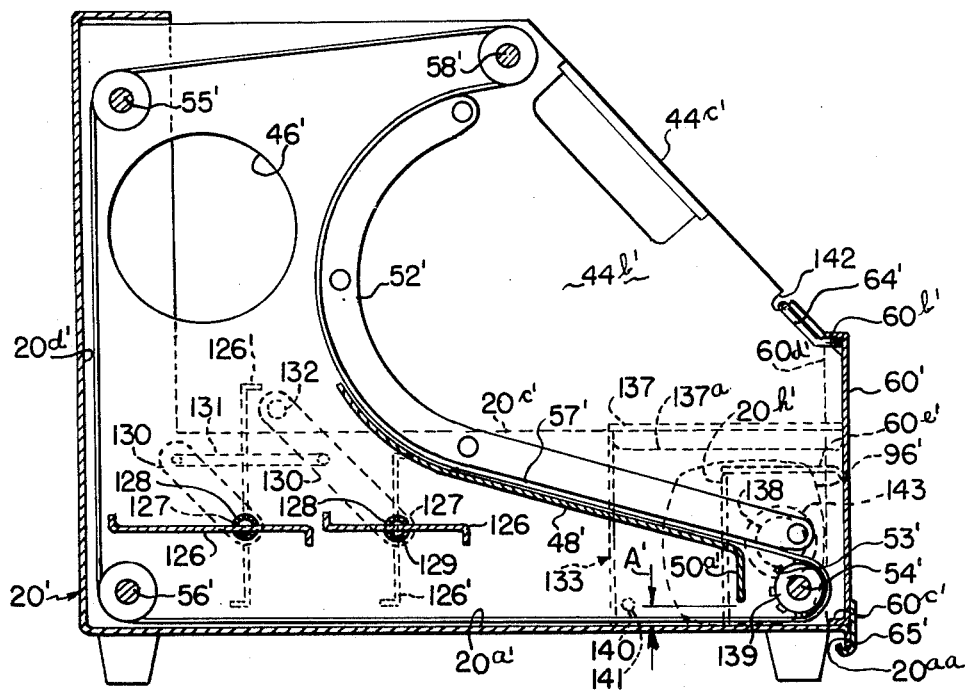
FIG. 20 is a central sectional view through a second embodiment of a dry coating unit.

FIG. 20 is a central sectional view through the assembled machine.

Figure 21:
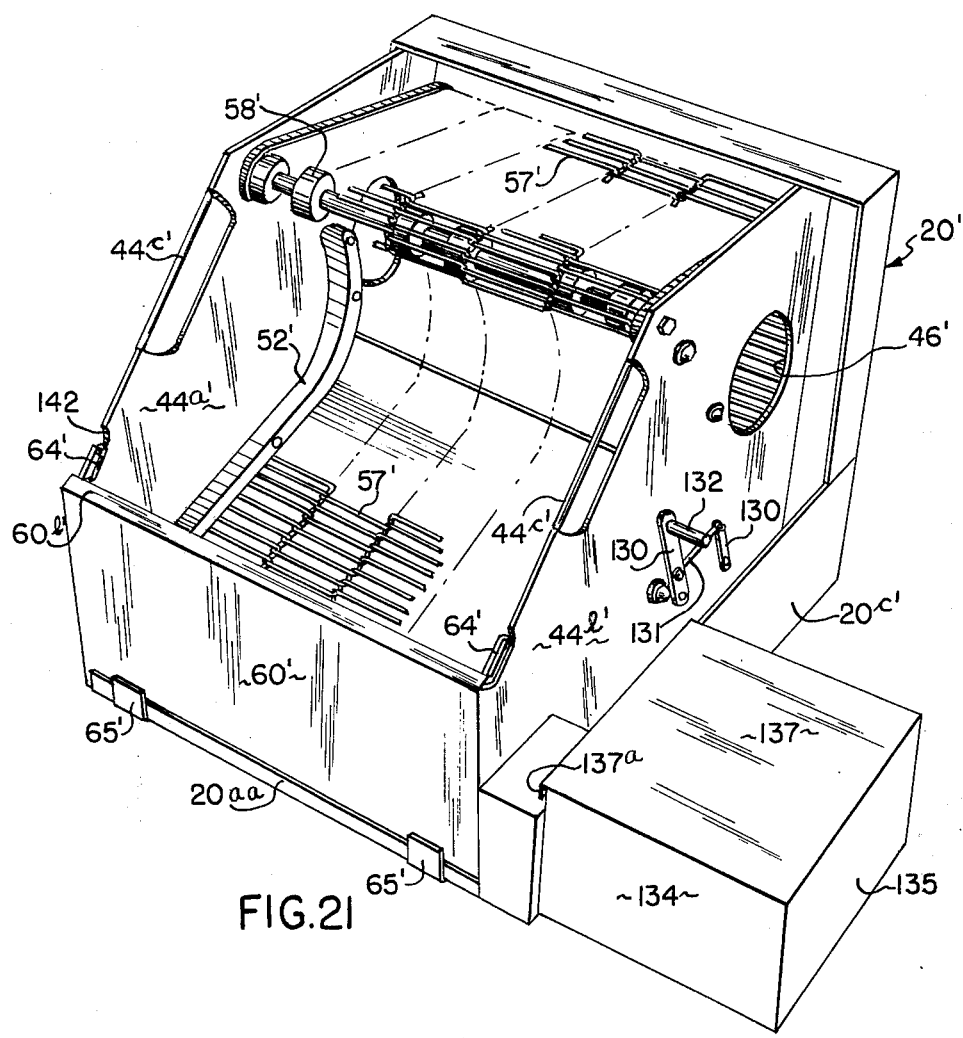
FIG. 21 is a perspective view of the second embodiment taken from the right-hand side of FIG. 20.

FIG. 21 is a perspective view taken from the right-hand side of FIG. 1.

Figure 22:
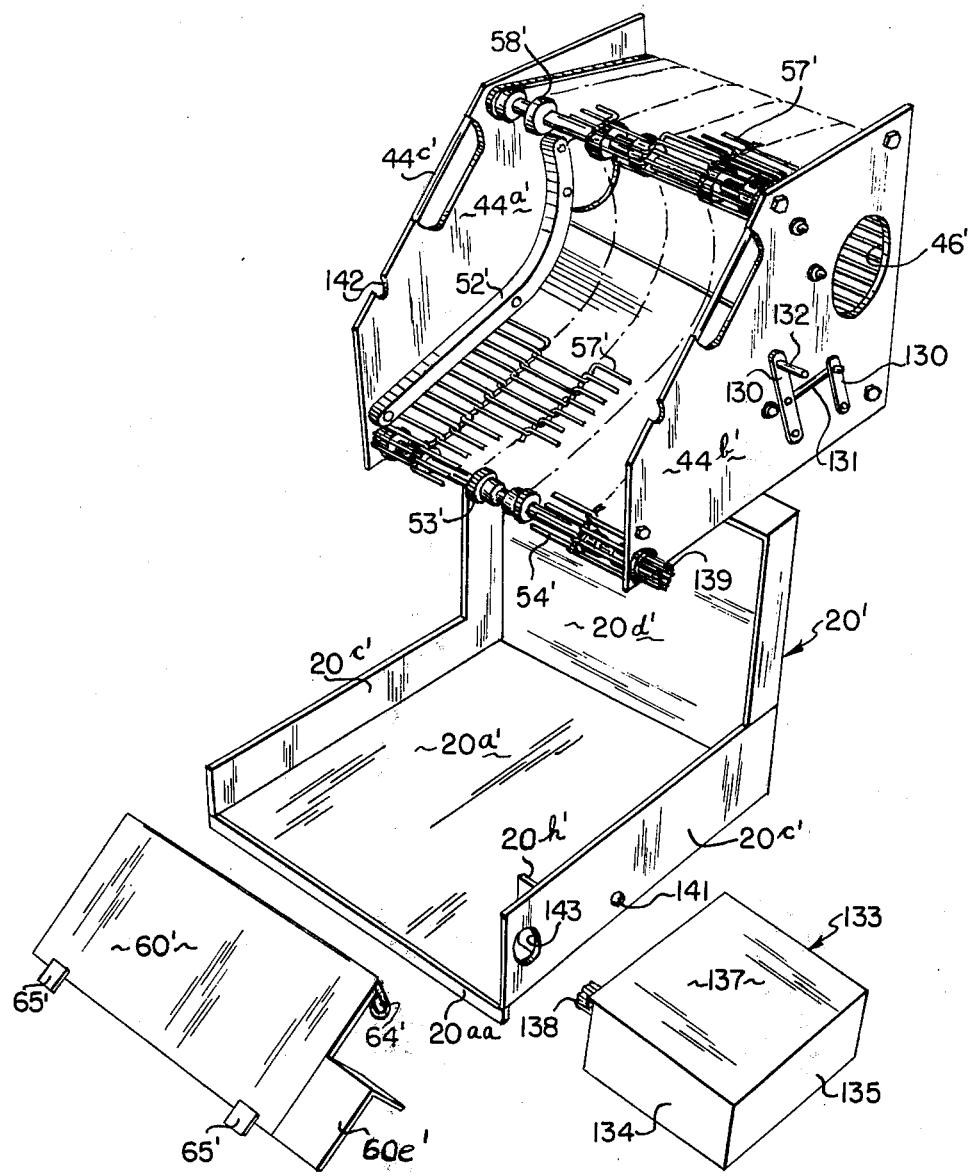

FIG. 22 is an exploded perspective view from the same view point as FIG. 21.

Figure 23:
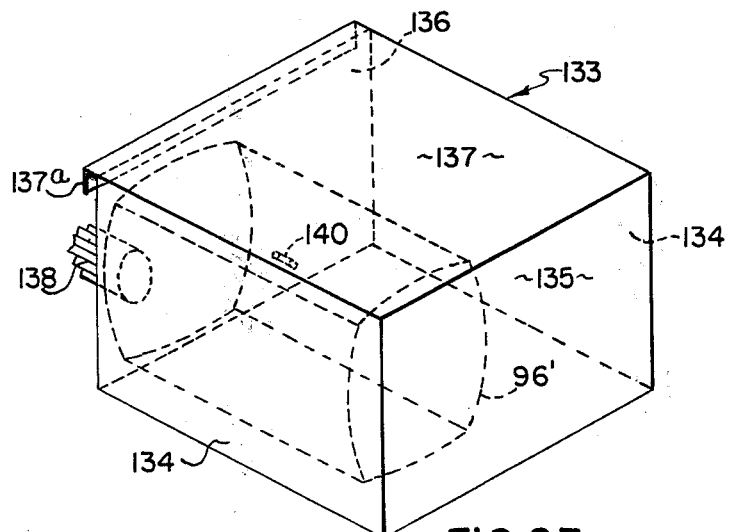
FIG. 23 is a perspective view, enlarged, of the drive motor box seen at the right in FIGS. 21 and 22.

FIG. 23 is a perspective view, enlarged, of the motor box or housing seen at the lower right-hand side of FIGS. 21 and 22.

In the figures, the same reference numbers as in the preceding figures for similar parts are used with the superscript prime. Thus 20' refers to the main frame, 20a' to the bottom wall thereof, 20d' to the back wall, and 20c' to the wall supporting the drive motor 96'. Similarly, 44a' and 44b' refer to the dry coating wall panels, 44c' to the lifting handles, 52' to the belt reversers, 57' to the belt and so on.

There are several radical differences between this embodiment and the first embodiment. Referring to FIGS. 1 and 20, the differences become apparent. The placement of shaft 54, the pan 48, the belt reversers 52, the cross rod 58 in relation to the bottom wall 20a are all identical.

However, cross rods 55' and 56' are somewhat closer horizontally to the tumbling volume in FIG. 20. The entire sifter arrangement 68 through 77 has been eliminated in FIG. 20, and a manually operated rotating shelf arrangement has been substituted. In each shelf unit, a shelf pan 126 is rotatably mounted on pins 127, 128 passing through holes 129 in wall panels 44a' and 44b'. Pin 128 has a squared shoulder on the end projecting through wall panel 44b' on which is mounted a lever arm 130 held by a bolt. The two lever arms 130 are connected by a link member 131, and one lever also has a handle member 132. The squared shoulders on pins 128, and the matching square holes in levers 130 are so arranged that moving the lever handle 132 through an arc of 90° also moves both shelves through an arc of 90°. The reason for this action is discussed later.

Another major difference between the embodiments of FIGS. 1 and 20 is in the dry coating pumping arrangement. As previously noted for FIG. 1, the pumping slot at A is defined by the bottom wall 20a, a roof wall 50c and portions of the two side panels 44a and 44b. This is to control recirculation rate independent of the reserve volume of dry coating material. The recirculation control feature is not as important in the second embodiment, therefore the slot has been simplified considerably, and is defined at A' in FIG. 20 by the bottom wall 20a', the lower edge of wall 50a' and portions of the two side panels 44a' and 44b'. The belt 57' carries coating material along bottom 20a', and slot A' limits the amount carried upward on the right side of wall 50a' in FIG. 20.

A third major difference between the embodiment of FIG. 1 and FIG. 20 is in the drive arrangement, best seen in FIGS. 22 and 23. The drive motor and switch are mounted in a box 133 having two side walls 134, an end wall 135, and end wall 136 and a top wall 137. A short extension of top wall 137 beyond end wall 136 has a downturned flange 137a which hooks over the top of wall 20c' in such a manner that the motor box 133 is suspended thereby. The drive motor 96' is mounted inside the box with its drive shaft extending through end wall 136, the shaft carrying a drive gear 138 which will drive the matching gear 139 on dry coat drive shaft 54'. The end wall 136 has a projecting pin 140 located thereon near the bottom edge thereof, which enters opening 141 in wall 20c' when the motor box 133 is mounted on the wall 20c'. The pin 140 serves to keep the box 133 from moving under pressure of the drive and keeps the drive gears 138 and 139 in proper register. Removal of the box 133 permits the entire frame 20' to be washed in a sink.

A fourth difference between the embodiments of FIGS. 1 and 20 is the configuration of the shroud. Referring to FIGS. 20 and 22, the shroud 60' is a flat plate with inturned flanges 60d' on both ends, 60b' on the top edge and 60c' on the bottom edge. The two bent plate hooks 65' hook under the downturned front edge 20aa of bottom wall 20c', and the two closed loop wire rings 64' drop into slots 142 in side panels 44a' and 44b'. The shroud, when in position, serves to hold the dry coating conveyor in position in frame 20', and to close the open end of the dry coating housing. The plate extension 60e' in conjunction with gusset 20h' in frame 20' serves to guard the gears 139 and 138 from personnel contact.

To assemble the second embodiment of the machine, the motor box is held in both hands with the end wall 135 slightly higher. The gear 139 is inserted through opening 143 in side wall 20c', until the downturned flange 137a will drop over the top of wall 20c'. Then the end wall 135 is lowered until pin 140 enters opening 141 in wall 20c'. Next, the dry coating unit is installed by grasping the two handles 44c' and sliding the unit into the front of frame 20' until the drive gears 139, 138 mesh. The shroud 60' is installed by holding it with the bottom edge 60c' closest to the frame 20', hooking the hooks 65' under the flange 20aa, and then rotating the top edge 60b' upwardly and inwardly toward the machine until the ends 60d' embrace the side panels 44a' and 44b' of the dry coating unit. The rings 64' are then dropped into slots 142 and the unit is fully assembled.

A fifth major difference between the two embodiments is in the production capacity of the machine. The overall width of the dry coating unit in the second embodiment is only half of that in the first embodiment. Therefore, the production capacity per batch is approximately one-half that of the first embodiment. In addition, because the unit of the second embodiment contains no automatic timing features, time per batch processed may be somewhat longer.

In the use of the assembled machine in the second embodiment, the lever handle 132 is pulled forward toward the drive end until the shelf pans 126 are in substantially vertical planes as indicated in dotted lines 126' in FIG. 20. The dry coating material is added to the machine until a sufficient puddle accumulates on pan 48' while the motor 96' is operating. The batch of product is placed on the belt 57' and allowed to tumble for a few seconds in the dry coating material. Then the lever handle 132 is pushed toward the rear wall 20d' until the shelf pans 126 are essentially horizontal as indicated in full lines in FIG. 20. Within about 15 seconds, as the unit continues to operate, excess dry coating material is carried out of pan 48' by the belt 57' and deposited upon the shelf pan 126. At this point, the unit may be stopped and the product may be removed from the unit free of excess dry coating material. Prior to feeding the next batch, the lever handle 132 is again pulled forward to dump the load of dry coating material off of shelf pans 126, and the motor 96' is again started.

The product results obtained from the two embodiments are essentially identical.

The second embodiment illustrates a few of the changes which can be made from the first embodiment, without detracting from the invention.

It is understood that persons skilled in the art can incorporate many changes in the construction of this machine, to permit the use of different coating materials, to remove more or less excess wet coating material, to increase or decrease the production capacity of the machine, to increase or decrease the sifting capacity, to increase or decrease the dry material recirculation rate, to sophisticate the controls to the point of single push button operation, and to modify drives for single motor operation. None of these possible changes detract from the present invention.

In the wet coat section, the generally horizontal portion of the pan may be sloped more or less, the pan radius may be more or less, the pan arc may be continued upwardly another 90 degrees or more, or may be considerably lessened, the width may be wider or narrower, the wet coat pool may be deeper or shallower, different mesh belt configurations may be used consistent with product processed, cross rod 34 may be eliminated to allow the return run of the belt to be guided by the under side of the pan, blowers may be added to assist in excess wet coat removal, the frame may be designed so that the return run of the belt stays within the pan to further minimize dripping.

In the dry coat section, the generally horizontal portion of the pan may be increased or decreased in slope within the limits indicated, the trailing edge line may be raised or lowered consistent with the dry coating "puddle" desired, the width may be wider or narrower, different belt configurations may be used consistent with product processed, space for the sifter may be increased or decreased or even eliminated, the pumping slot at "A" in FIG. 1 may be increased or decreased in two dimensions to vary the recirculation rate desired or to adapt to different types of dry coating materials, the entire section may be built to contain its own bottom and rear walls.

In the sifter, the horizontal area may be increased or decreased, the stroke may be lengthened or shortened, the cyclic rate may be varied either way, the vertical legs of the side frame may be higher for better coating material retention, the cam configuration may be changed to give more impact at directional changes, the cam may be eliminated and other drives substituted, the mesh may be coarser or finer consistent with coating material used and results desired. The sifter can even be eliminated.

The shroud configuration may be extensively changed, the locking and fastening arrangement may be changed to suit other fabrication techniques.

This machine was specifically designed to coat a particular product in a particular way. However, it has successfully processed onion rings, unfrozen fish fillets and clam strips. Its use is also envisioned with mushrooms, shrimp, whole clams, oysters and many other food items.

The dry coating section was designed specifically for use with a flour type dry coating material. However, it has successfully operated with a granular type of ground cracker meal and its use is envisioned with several other types of breading. The screen mesh would then be opened to accommodate the larger granular particles.

What is claimed is:

1. A food coating machine comprising a housing having parallel side walls and a bottom, an imperforate pan for containing a fluidized pool of coating material extending between said side walls, said pan having a generally flat end supported in said housing in a generally horizontal position, said pan having its opposite end curved smoothly upwardly through an arc tangent to said flat end, said arc extending from the point of tangency until the radius of said arc has swept through an angle between about 45° and 120° past the said point of tangency, an endless open mesh wire conveyor belt substantially the width of said pan, means guiding a working run of said belt close to the upper surface of said pan along said curved end, there being a return run of said belt spaced from said working run, there being a clear space above said working run, and means for driving said belt to carry said working run in a first direction from said flat end toward said curved end of said pan, whereby a pool of fluidized coating material may be provided in said pan, food portions may be placed in said pool and said conveyor belt may be driven in said direction to tumble said food portions in said pool of coating material to thoroughly coat the same.

2. Two food coating machines each as defined in claim 1, a frame supporting said machines one as an upper machine above and the other as a lower machine, said coating material is wet in said upper machine, said coating material is dry finely divided material in said lower machine, means is provided to drive said conveyor belt of said upper machine selectively in an opposite direction to discharge food portions from said upper machine, and said conveyor belt drive means of said upper machine including a pulley in said portion-discharge position directly over said flat end of said pan of said lower machine, whereby food portions may be wet coated in said upper machine with its conveyor belt traveling in said first direction, then said conveyor belt of said upper machine may be driven in said opposite direction to drop said food to said lower machine to be dry coated there.

3. The combination of two coating machines as defined in claim 2, wherein said frame has a bottom and one side wall and a back wall having vertical lower and upper portions connected by a horizontal shelf, a drip pan support rod is fixed horizontally between said side walls of said lower housing toward the front top thereof, a drip pan adapted to extend from beneath said pulley of said upper machine for the full length of said first named pan of said upper machine, said drip pan having a cross member rigid therewith near the back portion of said drip pan, said drip pan having a bottom the major portion of which inclines upwardly toward said pulley, said drip pan having parallel side walls extending downwardly below said bottom inclined portion and there lying closely outside said side walls of said lower machine, and said drip pan side walls extending above said cross member and there lying closely outside the side walls of said upper machine, the bottom of said drip pan resting on said shelf, and the bottom of said upper machine housing resting on said cross member, whereby said upper and lower machines and said drip pan may be assembled and disassembled quickly without the use of tools.

4. A food coating machine as defined in claim 1, wherein said coating material is wet, said pan has said curved end dipping below the level of said generally horizontal flat end to provide a pool of coating material there, said conveyor belt has a cross rod suspending said belt above said flat end only of said pan, and means is provided for driving said conveyor belt selectively in an opposite direction to discharge said wet-coated product, said conveyor belt drive means including a pulley outside of said flat end of said pan in said portion-discharge position, whereby when said food portions are coated with said conveyor belt traveling in said first direction, said conveyor belt may be caused to travel in said opposite direction to discharge said food portions and excess wet coating material may drip from said cross rod onto said pan.

5. A food coating machine as defined in claim 4, wherein said conveyor belt is endless and has a return run, a cross rod supporting said return run above said pan curved end, and said pan having a portion directly below said last-named cross rod to catch drippings of said wet coating material from said cross rod.

6. A food coating machine as defined in claim 4, including a drip pan supported relative to said housing and extending from beneath said pulley for the full length of said first-named pan, said drip pan having a support member rigid therewith and engaging the bottom of said housing to support it.

7. A food coating machine as defined in claim 1, wherein said coating material is a dry finely divided material which flows almost like a liquid when agitated, said generally flat end of said pan is inclined upwardly toward said curved end at an angle between 5° and 20°, means for temporarily holding coating material directly below the end of the curved end of the pan, said conveyor belt having a supporting pulley below and near the flat end of said pan, a generally vertical wall extending across said housing beneath and connected with said flat end of said pan and spaced slightly ahead of said supporting pulley and extending downwardly to a zone spaced a predetermined distance above said bottom, defining a slot between its bottom edge and said housing bottom, and said return run of said belt extending through said slot adjacent said bottom and around said supporting pulley, whereby dry finely divided coating material is carried by said belt through said slot and passed up through said conveyor belt and carried by said belt along said pan to fall off the opposite end of said pan.

8. A food coating machine as defined in claim 7, wherein said means for temporarily holding coating material comprises a sifter supported above said conveyor belt return run and having a screen fine enough to hold back said coating, and controllable means for shaking said sifter.

9. A food coating machine as defined in claim 8, wherein said means for shaking said sifter comprises a horizontal rotatable shaft in said housing, means for rotating said shaft, a rotary cylindrical cam fixed concentric with said shaft to rotate therewith, there being an inwardly extending sinuous slot extending uninterruptedly around the periphery of said cam and generally in a plane inclined relatively to said cam axis, the sides of said slot being radial of said cam, an extending pin fixed to one side of said sifter in position to enter said slot aligned with the axis of said shaft, and means guiding said sifter for motion parallel to said shaft axis, whereby said rotating cam imparts a reciprocating motion to said sifter.

10. A food coating machine as defined in claim 8, wherein said sifter comprises a tray, a mesh screen removably held in said sifter tray, and there being an opening through a side wall of said housing directly opposite said sifter screen and of a size for said sifter screen to pass through and a removable closure for said last named opening.

11. A food coating machine as defined in claim 7, wherein said means for temporarily holding coating material comprises oscillatable vane means movable into and out of horizontal position, in which position it holds back most of said coating.

12. A food coating machine as defined in claim 7, wherein said slot includes a slot roof connected to the bottom edge of said wall substantially at right angles thereto and extending along the length of said wall.

13. A food coating machine as defined in claim 7, wherein said housing is open at an end parallel to and adjacent to said supporting pulley, a removable imperforate shroud is provided of a size to close said end from one of said side walls to the other of said side walls and to extend upwardly from said bottom to a level approximately the height of the termination of said curved end, and detachable means for holding said shroud tightly to said side walls and to said bottom.

14. A food coating machine as defined in claim 7, wherein said curved end of said pan extends between 45° and 70° beyond said generally flat end, whereby the retention of said dry coating material on top of said pan is approximately regulated during operation.

15. A food coating machine as defined in claim 1, wherein said coating material is a dry finely divided material which flows almost like a liquid when agitated, means for temporarily holding coating material directly below the upper end of the curved end of the pan, said last named means comprising flat shelf pan means having means for oscillating the same from a horizontal position, where said coating material is held on said shelf pan means, and a vertical position where said coating material is released.

16. A food coating machine as defined in claim 15, wherein said shelf pan means comprises two shelf pans substantially touching each other and supported for rotation at a common level, and said means for oscillating the same is common to both shelf pans.

17. A food coating machine as defined in claim 15, wherein means is provided to guide said open mesh conveyor belt along the bottom of said housing, whereby dry coating material is moved from beneath said shelf pan means to the entrance of said pan generally flat end and forced through said open mesh of said conveyor onto said pan.

* * * * *